(12) United States Patent
Wingo

(10) Patent No.: US 6,694,101 B1
(45) Date of Patent: Feb. 17, 2004

(54) FOCAL PLANE DIVISION MULTIPLEXING SYSTEM AND METHOD

(75) Inventor: Dale T. Wingo, Richardson, TX (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/224,501

(22) Filed: Dec. 31, 1998

(51) Int. Cl.$^7$ .......................... H04B 10/00; H04B 10/10
(52) U.S. Cl. .................. 398/130; 398/128; 398/140
(58) Field of Search ................. 359/119, 159, 359/124–134, 115, 154, 171, 173

(56) References Cited

U.S. PATENT DOCUMENTS

| | | | | |
|---|---|---|---|---|
| 3,633,035 A | * | 1/1972 | Uchida | 455/612 |
| 5,078,499 A | * | 1/1992 | LaMarche | 359/19 |
| 5,412,506 A | * | 5/1995 | Feldblum et al. | 359/569 |
| 5,822,096 A | * | 10/1998 | Redmond et al. | 359/129 |
| 5,857,042 A | * | 1/1999 | Robertson et al. | 385/33 |
| 5,986,788 A | * | 11/1999 | Sasaki et al. | 359/163 |
| 6,014,236 A | * | 1/2000 | Flaherty | 359/118 |
| 6,289,152 B1 | * | 9/2001 | Zhang et al. | 385/33 |
| 6,304,694 B1 | * | 10/2001 | Ford | 385/33 |
| 6,411,414 B1 | * | 6/2002 | Abate et al. | 359/154 |

OTHER PUBLICATIONS

IBM Technical Bulletin NN80112362, Non Impact Printing Using Optical Fibers, Nov. 1, 1980.*

* cited by examiner

Primary Examiner—Leslie Pascal
Assistant Examiner—Agustin Bello

(57) ABSTRACT

An optical communications system includes spaced apart first and second optical elements. Each optical element has a focal plane. A plurality of optical transmitters, each of which includes a light emitting element, are disposed spaced apart from each other in the focal plane of the first optical element. A plurality of optical receivers, each of which includes a light receiving element, are disposed spaced apart from each other in the focal plane of the second optical element. Optical signals emitted by the light emitting elements are received at first optical element and combined into a single beam. The single beam is received at the second optical element. The second optical element separates the single beam into separate optical signals. The separate optical signals are focused onto the receiving elements.

22 Claims, 1 Drawing Sheet

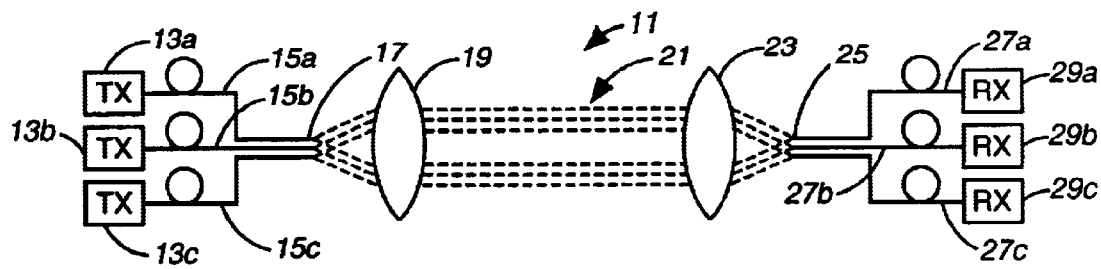
FIG. 1
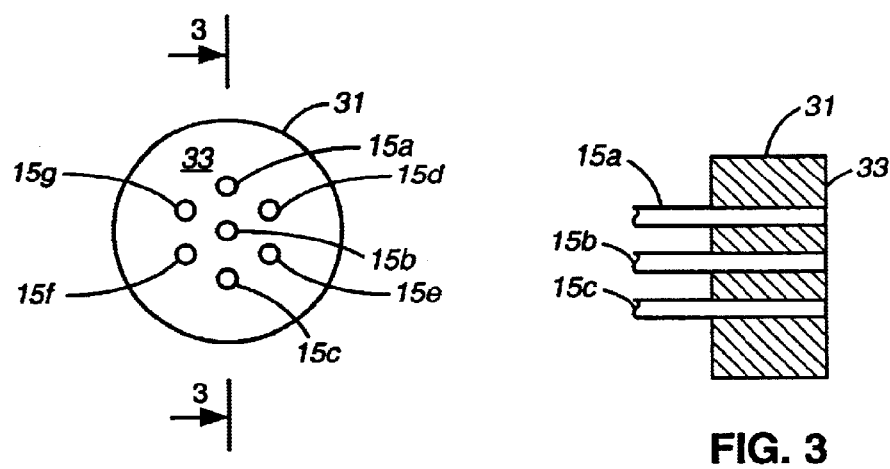
FIG. 2
FIG. 3
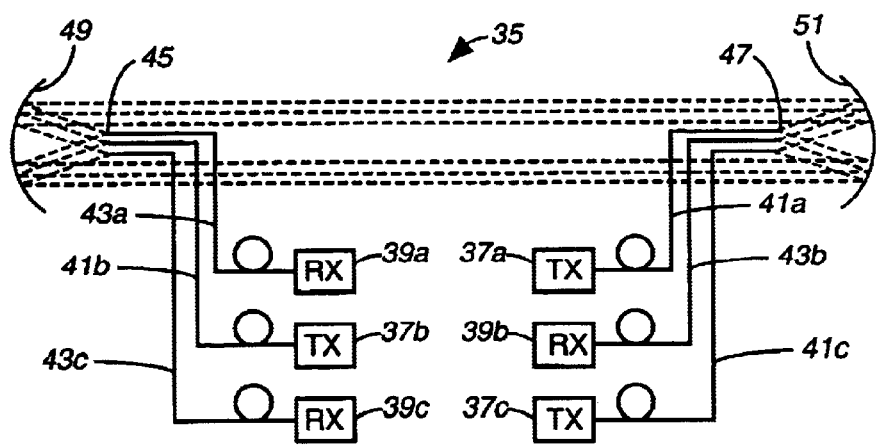
FIG. 4

FOCAL PLANE DIVISION MULTIPLEXING SYSTEM AND METHOD

FIELD OF THE INVENTION

The present invention relates generally to free-space optical communication systems and methods, and more particularly to a method of and system for transmitting information through free-space by focal plane multiplexing.

DESCRIPTION OF THE PRIOR ART

Free-space optical transmission offers an attractive alternative to conventional fiber optic transmission in military and commercial applications. Free-space optical transmission is similar to fiber optic transmission except that the light beam is transmitted through the air or space rather than through an optical fiber cable. Some of the advantages of free-space optical transmission over fiber optic transmission are low dispersion and the avoidance of having to lay optical cables. Not having to lay optical cables is particularly attractive in achieving connectivity between existing buildings in a downtown or campus environment.

A free-space optical transmission system includes an infrared laser transmitter and a receiver. The laser transmitter is positioned on one building and it is aimed at the transmitter positioned on another building. Typically, a transmitter and receiver are located at each site so that bidirectional communication can be achieved. Currently, free-space laser transmission systems can operate at data rates up to about 155 megabytes per second (Mbps) at distances over a mile. Free-space optical transmission systems operate on conventional protocols such as Ethernet, ATM, FDDI, and the like.

There is always a demand for higher data rates. While 155 Mbps is a fairly high transmission rate, there are currently Gigabit Ethernet systems. If free-space optical communication systems are to meet the demand, then their data rates must be increased by at least an order of magnitude. With the current technology, such an increase is not possible.

It is therefore an object of the present invention to increase the data rate of a free-space optical communications system.

SUMMARY OF THE INVENTION

The present invention increases the data rate of a free-space optical communications system by focal plane multiplexing. The system of the present invention includes spaced apart first and second optical elements. Each optical element has a focal plane. The system includes a plurality of optical transmitters, each of which includes a light emitting element. The light emitting elements are disposed spaced apart from each other in the focal plane of the first optical element. The system also includes a plurality of optical receivers, each of which includes a light receiving element. The light receiving elements are disposed spaced apart from each other in the focal plane of the second optical element.

Optical signals emitted by the light emitting elements are received at first optical element and combined into a single beam. The single beam is received at the second optical element. The second optical element separates the single beam into separate optical signals. The separate optical signals are focused onto the receiving elements, which are positioned on the focal plane of the second optical element.

Preferably, the optical signals are all emitted on the same optical wavelength. The first optical element effectively multiplexes the optical signals by combining them into a single beam. The second optical element demultiplexes the optical signals by focusing the separate signals on different points of its focal plane.

BRIEF DESCRIPTION OF THE DRAWINGS

FIG. 1 is a block diagram of a free-space optical transmission system according to the present invention.

FIG. 2 is a front view of a fiber block according to the present invention.

FIG. 3 is a sectional view taken along line 3—3 of FIG. 2 of the fiber block of the present invention.

FIG. 4 is a block diagram of an alternative embodiment of the free-space optical transmission system of the present invention.

DESCRIPTION OF THE PREFERRED EMBODIMENT

Referring now to the drawing, and first to FIG. 1, a system according to the present invention is designated generally by the numeral 11. System 11 includes a plurality of optical transmitters 13. Preferably, optical transmitters 13 include infrared lasers and appropriate modulators for converting a signal from the electrical domain to the optical domain, in the manner well known to those skilled in the art. All of the lasers of optical transmitters 13 are preferably adapted to transmit an optical signal on the same wavelength, which in the preferred embodiment is about 1550 nanometers. While three optical transmitters 13 are illustrated in FIG. 1, those skilled in the art will recognize that any number of transmitters may be used according to the present invention.

Each transmitter 13 is optically coupled to an optical fiber 15. Optical fibers 15 are conveniently combined into an optical cable (not shown), as is known in the art. Transmitters 13 are preferably located somewhere in a building and the optical cable that includes optical fibers 15 is routed through the building in the known manner to an exterior location of the building.

According to the present invention, the ends of cables 15 opposite their connections to transmitters 13 are positioned in a plane indicated by dashed line 17. Plane 17 is the focal plane of an optical element, which in the embodiment of FIG. 1 is a lens 19. The fiber ends are spaced apart from each other in plane 17 and signals emanate therefrom in a cone due to diffraction. The individual signals from the fiber ends are received at lens 19 and formed into a beam designated generally by the numeral 21.

Beam 21 is substantially parallel and it travels in a line-of-sight to a second optical element, which in the embodiment of FIG. 1 is a lens 23. Lens 23 focuses beam 21 onto a focal plane, indicated by dashed line 25. A plurality of ends of optical fibers 27 are positioned spaced apart from each other in focal plane 25. Fibers 27 are optically coupled to a plurality of optical receivers 29 that convert signals from the optical domain to the electrical domain in the manner well known to those skilled in the art.

The ends of fibers 27 are positioned in plane 25 to correspond to the positions of the ends of fibers 15 and plane 17. Thus, the optical signal from transmitter 13a is multiplexed with the signals from transmitters 13b and 13c by lens 19 into beam 21, which is the demultiplexed by lens 23. The signal from transmitter 13a is thus received at receiver 29a. Similarly, the signals from transmitters 13b and 13c are received at receivers 29b and 29c, respectively.

Referring now to FIGS. 2 and 3, there is shown a preferred system for mounting the optical fiber ends according to the present invention. Fibers 15 (or 27) are mounted in a block 31 of epoxy or the like. Preferably, fibers 15 are positioned in a suitable mold and block 31 is formed about them. After block 31 has set, then block 31 may be sawed or ground to form a flat face 33. Block 31 may then be positioned appropriately with respect to its associated optical element such that face 31 is in the focal plane of the optical element.

Referring now to FIG. 4, there is shown an alternative embodiment of the present invention, which is designated generally by the numeral 35. System 35 includes a plurality of transmitters 37 and a plurality of receivers 39. It will be noted that in system 35, transmitters and receivers are located at both ends. Thus, system 35 is adapted for bidirectional communications. It should be appreciated that system 11 of FIG. 1 could be similarly configured with transmitters and receivers at both ends for bidirectional transmission.

The transmitters and receivers of system 35 are optically coupled to optical fibers 41 and 43 respectively. The ends of fibers 41 and 43 are disposed in planes 45 and 47. Planes 45 and 47 are defined by the focal planes of optical elements, which in system 35 are mirrors 49 and 51, respectively. Preferably, mirrors 49 and 51 are parabolic, although those skilled in the art will recognize that other optical elements, such as Cassegrainian optics, may be used.

From the foregoing, it may be seen that the system of the present invention achieves spatial or focal plane multiplexing. Separate channels are transmitted from location to location on the same wavelength and in the same physical space. Multiplexing/demultiplexing is achieved by spacing apart the light emitting elements of the transmitters and using appropriately spaced optical receivers at the receiving end. The present invention allows the data rate to be multiplied by the number of channels.

While the present invention has been described and illustrated with respect to presently preferred embodiments, those skilled in the art, given the benefit of this disclosure, will recognize alternative embodiments. Certain combinations and subcombinations of features may be used independently of other features. Accordingly, the spirit and scope of the present invention should be determined with reference to the claims.

What is claimed is:

1. An optical communications system, which comprises:
   a first optical element, said first optical element having a first focal plane, said first optical element including a mirror;
   a plurality of optical transmitters, each of said optical transmitters coupled to a light emitting optical fiber end, said light emitting optical fiber ends being disposed spaced apart from each other in said first focal plane of said first optical element, the light emitting optical fiber ends being fixed in a molded block;
   a second optical element spaced apart from said first optical element in a free-space channel with no other optical element disposed therebetween, said second optical element having a second focal plane, said second optical element including a mirror; and
   a plurality of optical receivers, each of said optical receivers coupled to a light receiving optical fiber end, said light receiving optical fiber ends being disposed spaced apart from each other in said second focal plane of said second optical element, the light receiving optical fiber ends being fixed in a molded block.

2. The system as claimed in claim 1, wherein said first optical element comprises a lens.

3. The system as claimed in claim 1, wherein said second optical element comprises a lens.

4. The system as claimed in claim 1, wherein each said optical transmitter includes an optical fiber and each said light emitting element is defined by an end of said optical fiber.

5. The system as claimed in claim 4, wherein said ends of said optical fibers are mounted in a block.

6. The system as claimed in claim 1, wherein each said optical receiver includes an optical fiber and each said light receiving element is defined by an end of said optical fiber.

7. The system as claimed in claim 6, wherein said ends of said optical fibers are mounted in a block.

8. The system as claimed in claim 1, wherein each of said optical transmitters transmits an optical signal on the same wavelength.

9. An optical communications systems, which comprises:
   a first optical element, said first optical element having a first focal plane, said first optical element including a mirror;
   a first optical transmitter and a first optical receiver, said first optical transmitter being coupled to a light emitting element and said first optical receiver being coupled to a light receiving element, said light emitting element and said light receiving element being disposed spaced apart from each other in said focal plane of said first optical element, the light emitting elements and the light receiving elements being fixed in a molded block;
   a second optical element spaced apart from said first optical element in a free-space channel with no other optical element disposed therebetween, said second optical element having a second focal plane, said second optical element including a mirror; and
   a second optical transmitter and a second optical receiver, said second optical transmitter being coupled to a light emitting element and said second optical receiver being coupled to a light receiving element, said light emitting element and said light receiving element being disposed spaced apart from each other in said focal plane of said second optical element, the light emitting elements and the light receiving elements being fixed in a molded block.

10. The system as claimed in claim 9, wherein said first optical element comprises a lens.

11. The system as claimed in claim 9, wherein said second optical element comprises a lens.

12. The system as claimed in claim 9, wherein each of said first and second optical transmitters includes an optical fiber and each said light emitting element is defined by an end of said optical fiber.

13. The system as claimed in claim 12, wherein said ends of said optical fibers are mounted in a block.

14. The system as claimed in claim 9, wherein each of said first and second optical receivers includes an optical fiber and each said light receiving element is defined by an end of said optical fiber.

15. The system as claimed in claim 14, wherein said ends of said optical fibers are mounted in a block.

16. The system as claimed in claim 9, wherein each of said optical transmitters transmits an optical signal on the same wavelength.

17. An optical communications system, which comprises:
   a first optical element, said first optical element having a first focal plane, said first optical element including a mirror; and,
   a plurality of optical receivers, each of said optical receivers coupled to a light receiving optical fiber end, said light receiving optical fiber ends being disposed spaced apart from each other in said first focal plane of said first optical element, the light receiving optical fiber ends being fixed in a molded block, the optical fiber ends being configured to receive light transmissions from a plurality of optical emitters over a free-space channel having no optical element disposed between the light receiving optical fiber ends and the first optical element.

18. The optical communications system as claimed in claim 17, comprising:

a second optical element spaced apart from said first optical element, said second optical element having a second focal plane, said first optical element including a mirror; and, a plurality of optical transmitters, each of said optical transmitters including a light emitting element, said light emitting elements being disposed spaced apart from each other in said second focal plane of said second optical element.

19. A method of free-space optical transmission, comprising the steps of:

providing a plurality of optical transmitters, each of said optical transmitters being coupled to a light emitting optical fiber end, said light emitting optical fiber ends being disposed spaced apart from each other in a first focal plane of a first optical element, said first optical element including a mirror;

transmitting a plurality of optical signals from the light emitting optical fiber ends;

providing a plurality of optical receivers, each of said optical receivers coupled to a light receiving optical fiber end, said light receiving optical fiber ends being disposed spaced apart from each other in a second focal plane of a second optical element, said second optical element including a mirror;

receiving said plurality of optical signals with the light receiving optical fiber ends, whereby said plurality of optical signals propagate in a free-space channel with no optical element disposed between the first optical element and the second optical element.

20. The method of claim 19 further comprising the steps of:

multiplexing said plurality of optical signals by said first optical element; and demultiplexing said plurality of optical signals by said second optical element.

21. The method of claim 20, wherein said step of transmitting a plurality of optical signals from a first focal plane of a first optical element, comprises the step of:

transmitting said plurality of optical signals from a plurality of optical transmitters, wherein each of said optical transmitters include a light emitting element, said light emitting element being disposed spaced apart from each other in said focal plane of said first optical element.

22. The method of claim 20, wherein said step of receiving a plurality of optical signals from a second focal plane of a second optical element, comprises the step of:

receiving said plurality of optical signals by a plurality of optical receivers, each of said optical receivers including a light receiving element, said light receiving elements being disposed spaced apart from each other in said second focal plane of said second optical element.

* * * * *